US011122487B2

(12) United States Patent
Koue

(10) Patent No.: US 11,122,487 B2
(45) Date of Patent: Sep. 14, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Toshiaki Koue, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 187 days.

(21) Appl. No.: 15/957,159

(22) Filed: Apr. 19, 2018

(65) Prior Publication Data

US 2018/0317204 A1 Nov. 1, 2018

(30) Foreign Application Priority Data

Apr. 28, 2017 (JP) .............................. JP2017-089769

(51) Int. Cl.
*H04W 36/30* (2009.01)
*H04W 72/02* (2009.01)
*H04W 72/08* (2009.01)
*H04W 72/04* (2009.01)
(Continued)

(52) U.S. Cl.
CPC .......... *H04W 36/30* (2013.01); *H04W 48/18* (2013.01); *H04W 72/02* (2013.01); *H04W 72/0453* (2013.01); *H04W 72/085* (2013.01); *H04W 76/14* (2018.02)

(58) Field of Classification Search
CPC . H04W 72/085; H04W 72/02; H04W 56/001; H04W 36/30; H04W 28/0268; H04W 72/1231
See application file for complete search history.

(56) References Cited

U.S. PATENT DOCUMENTS

2013/0044735 A1* 2/2013 Lee .................. H04W 84/12
370/336
2017/0034843 A1* 2/2017 Liu .................. H04L 45/24
(Continued)

FOREIGN PATENT DOCUMENTS

| JP | 2004-112180 A | 4/2004 |
| JP | 2004-343559 A | 12/2004 |
| JP | 2006-080782 A | 3/2006 |

(Continued)

OTHER PUBLICATIONS

Nov. 24, 2020 Office Action issued in Japanese Patent Application No. 2017-089769.
(Continued)

*Primary Examiner* — Omer S Mian
(74) *Attorney, Agent, or Firm* — Oliff PLC

(57) ABSTRACT

An information processing apparatus includes a communication unit and a selection unit. The communication unit is configured to conduct a wireless communication using plural transmission methods, one of which has plural channels. The selection unit is configured to select a channel and a transmission method in a communication with a communication counterpart device, according to (i) a predetermined selection order of the transmission methods and the channels and (ii) a transmission method or a channel using which the communication counterpart device is configured to conduct a communication.

7 Claims, 17 Drawing Sheets

(51) Int. Cl.
*H04W 48/18* (2009.01)
*H04W 76/14* (2018.01)

(56) References Cited

U.S. PATENT DOCUMENTS

2017/0289837 A1* 10/2017 Duo .................. H04W 28/0268
2018/0183468 A1* 6/2018 Emmanuel ............ H04W 28/08

FOREIGN PATENT DOCUMENTS

| | | |
|---|---|---|
| JP | 2010-232724 A | 10/2010 |
| JP | 2011-109341 A | 6/2011 |
| JP | 2013-197820 A | 9/2013 |
| JP | 2015-061274 A | 3/2015 |
| JP | 2016-025505 A | 2/2016 |

OTHER PUBLICATIONS

Jun. 15, 2021 Office Action issued in Japanese Patent Application No. 2017-089769.

* cited by examiner

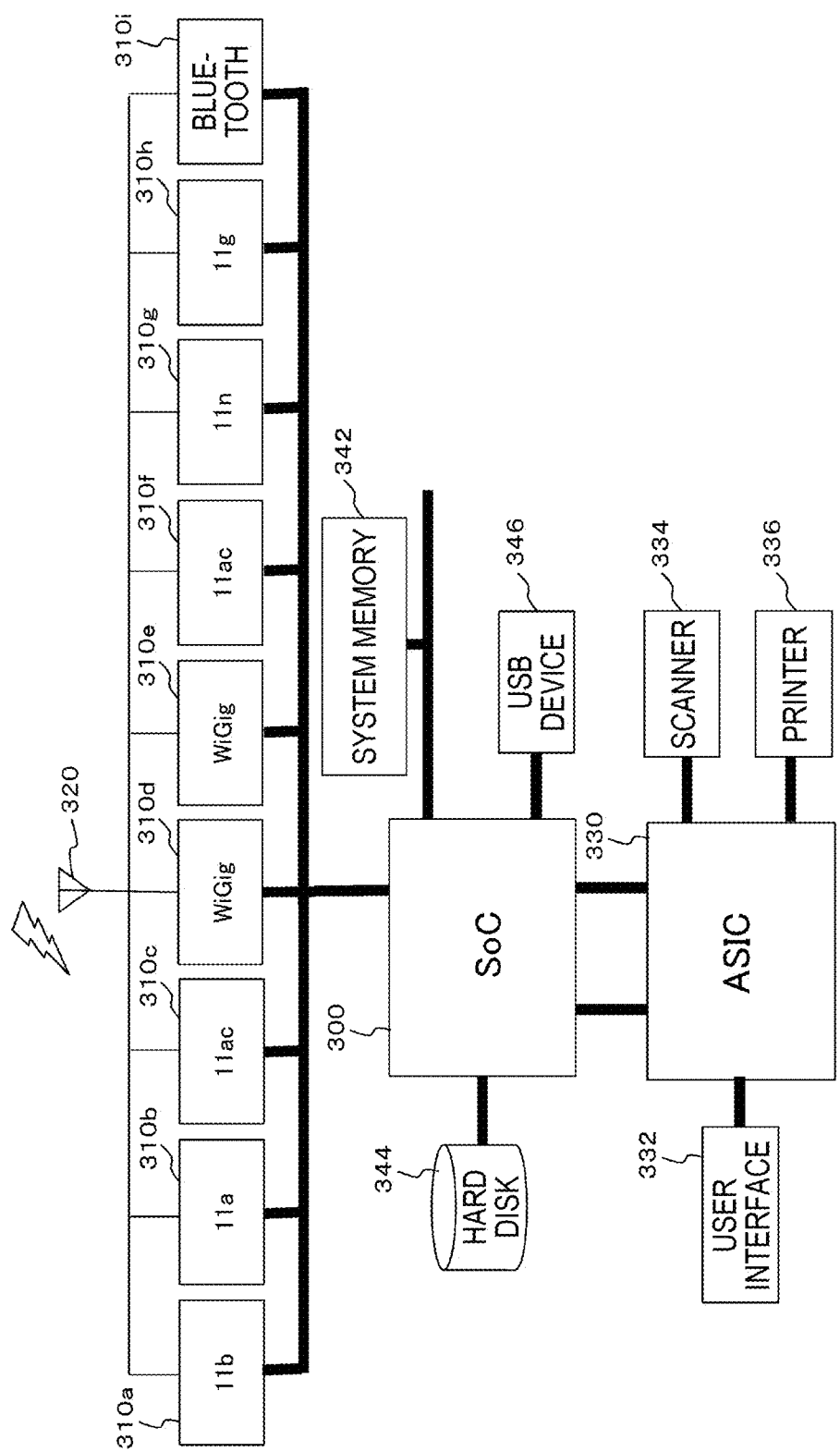

BANDWIDTH: 22MHz

FIG.6

| COMMUNICATION COUNTERPART DEVICE ID 610 | COMMUNICATION COUNTERPART DEVICE MODEL NAME 620 | COMMUNICATION COUNTERPART DEVICE USER 630 | NUMBER OF AVAILABLE TRANSMISSION METHODS 640 | AVAILABLE TRANSMISSION METHODS 650 |
|---|---|---|---|---|
| 12345 | abc | abc-user | 6 | 802.11ad, 802.11ac, 802.11n, 802.11g, 802.11b, 802.11a |
| ... | ... | ... | ... | ... |

600

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-089769 filed Apr. 28, 2017.

BACKGROUND

Technical Field

The present invention relates to an information processing apparatus and a non-transitory computer readable medium.

SUMMARY

According to an aspect of the invention, an information processing apparatus includes a communication unit and a selection unit. The communication unit is configured to conduct a wireless communication using plural transmission methods, one of which has plural channels. The selection unit is configured to select a channel and a transmission method in a communication with a communication counterpart device, according to (i) a predetermined selection order of the transmission methods and the channels and (ii) a transmission method or a channel using which the communication counterpart device is configured to conduct a communication.

BRIEF DESCRIPTION OF THE DRAWINGS

Exemplary embodiments of the present invention will be described in detail based on the following figures, wherein:

FIG. 3 is an explanatory view illustrating a specific exemplary configuration of the exemplary embodiment;

FIG. 6 is an explanatory view illustrating an exemplary data structure of a communication counterpart device communication capability information table;

DETAILED DESCRIPTION

Hereinafter, an exemplary embodiment suitable for implementing the present invention will be described with reference to the accompanying drawings.

Figure 1:
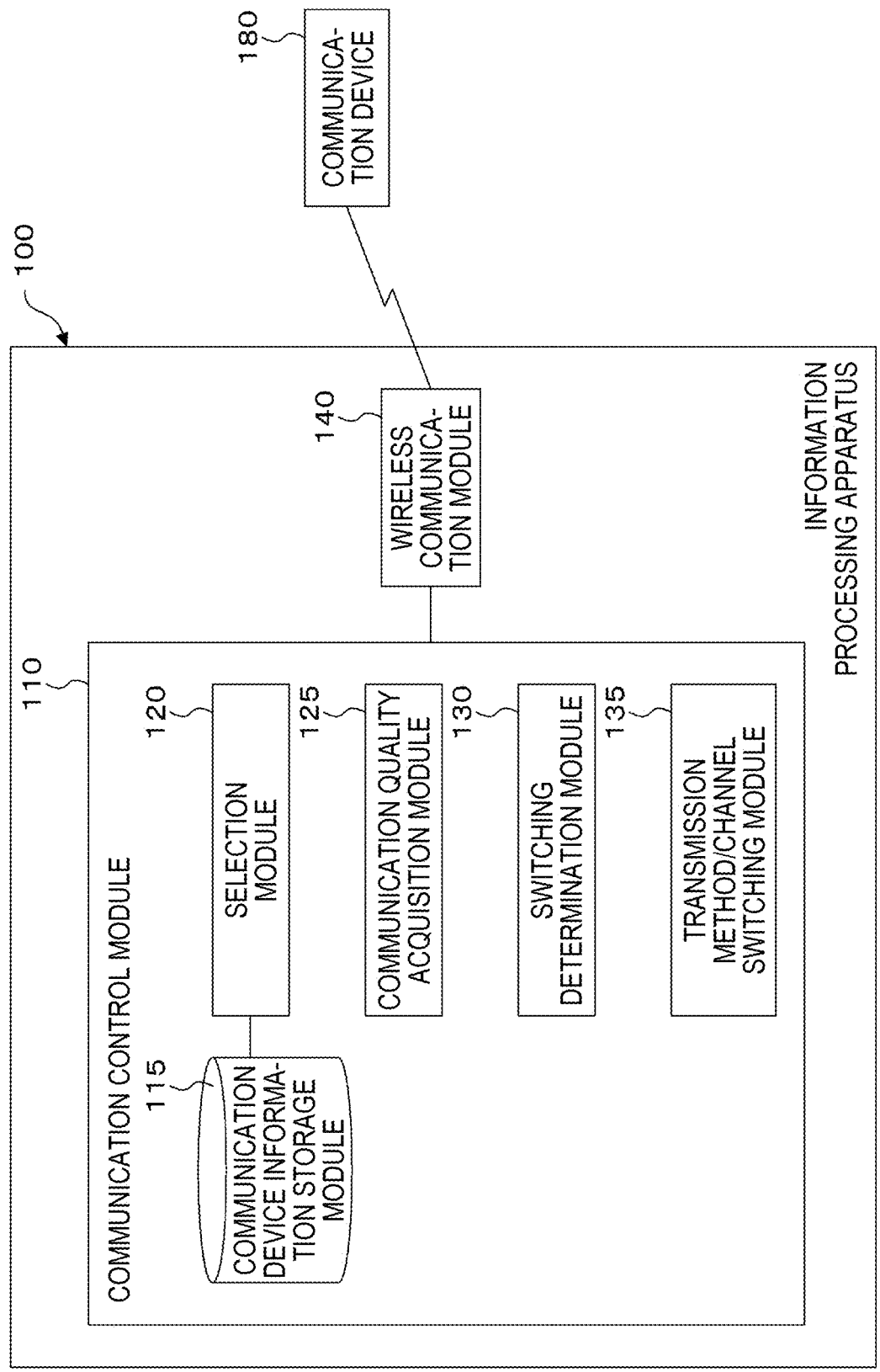
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For the convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In an implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the predetermined values may be different from each other, or two or more of the predetermined values (or all the predetermined values, of course) may be equal to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication. The information processing apparatus 100 includes a communication control module 110 and a wireless communication module 140 as illustrated in the example of FIG. 1.

A communication device 180 is connected to the wireless communication module 140 of the information processing apparatus 100 via a communication line. The communication device 180 is capable of conducting a wireless communication and is, for example, a mobile information terminal, a notebook PC, or an access point. There may be provided multiple communication devices 180 that are capable of conducting a wireless communication with the information processing apparatus 100. For example, there may be a case where multiple communication devices 180 each equipped with WiGig are provided and more communication devices 180 than the number of communication lines, in the information processing apparatus 100, capable of conducting the WiGig communication may request a communication. This case corresponds to, for example, a case where a communication device 180 serving as an authentication device, another communication device 180 serving as a storage device, further another communication device 180 serving as a display device, and the like request a communication. In this case, one of the communication devices 180 conducts a communication by WiGig and other ones of the communication devices 180 conduct a communication by transmission methods other than WiGig (transmission methods having a slower communication speed than WiGig). However, in general, communication times of the communication devices 180 are different from each other. Thus, when the communication of the communication device 180 which is conducting a communication using WiGig is ended, the information processing apparatus 100 switches a transmission method of another communication device 180 to WiGig even if the other communication device 180 has already conducted a communication using a transmission method other than WiGig. As a result, the communication may be completed faster than the case where the communication by the transmission method other than WiGig is continued.

The wireless communication module 140 is connected to the communication control module 110 and also connected to the communication device 180 via the communication line. The wireless communication module 140 is capable of conducting a wireless communication using multiple transmission methods. Further, the wireless communication module 140 is capable of conducting a wireless communication with multiple communication devices 180. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

At least one of the transmission methods of the wireless communication module 140 has multiple channels (wireless communication paths). Of course, each of all the transmission methods may have multiple channels.

In addition, the transmission methods using which the wireless communication module 140 is capable of conducting a wireless communication may include at least IEEE802.11ad.

The communication control module 110 includes a communication device information storage module 115, a selection module 120, a communication quality acquisition module 125, a switching determination module 130, and a transmission method/channel switching module 135. The communication control module 110 is connected to the wireless communication module 140. The communication control module 110 controls the wireless communication between the information processing apparatus 100 and the communication device 180.

The communication device information storage module 115 is connected to the selection module 120. The communication device information storage module 115 stores a predetermined selection order of transmission methods and channels. For example, the communication device information storage module 115 stores a priority table 700 (which will be described later) illustrated in an example of FIG. 7, a priority table 800 (which will be described later) illustrated in an example of FIG. 8, and the like.

In addition, the communication device information storage module 115 stores a transmission method or a channel using which the communication device 180 as a communication counterpart device is capable of conducting a communication. For example, the communication device information storage module 115 stores a communication counterpart device communication capability information table 600 (which will be described later) illustrated in an example of FIG. 6 and the like.

The selection module 120 is connected to the communication device information storage module 115. The selection module 120 selects a channel and a transmission method in a communication with the communication device 180, according to (i) the predetermined selection order of transmission methods and channels and (ii) the transmission method or channel using which the communication device 180 as the communication counterpart device is capable of conducting a communication.

In addition, the selection module 120 may select the channel and the transmission method in the communication with the communication device 180, for each communication device 180 which is the communication counterpart device.

In addition, if a predetermined transmission method and channel among transmission methods and channels which are provided in the information processing apparatus match a predetermined transmission method and channel among transmission methods and channels which are provided in the communication counterpart device and if one or both of (i) the predetermined transmission method and channel of the information processing apparatus and (ii) the predetermined transmission method and channel of the communication counterpart device are unavailable, the selection module 120 stands by until the both become available or selects another transmission method and another channel.

Here, the "predetermined transmission method and channel" may be a transmission method and a channel which have the highest communication quality. In addition, a "high communication quality" indicates, for example, a fast communication speed, the small number of errors or the like.

In addition, the selection module 120 may select a channel and a transmission method in the communication with the communication device 180, according to a remaining communication amount. Here, the description "according to the remaining communication amount" means comparing (i) a time required for a communication in a case where the communication is conducted by a predetermined channel A1 or a transmission method A2 after standing by until the communication by the predetermined channel A1 or the transmission method A2 becomes possible (that is a sum of the standby time and the communication time) and (ii) a time required for a communication in a case where the communication is immediately conducted by another channel B1 and another transmission method B2 and selecting one requiring a relatively short communication completion time from (i) the predetermined channel A1 or the predetermined transmission method A2 and (ii) the other channel B1 or the other transmission method B2.

The communication quality acquisition module 125 acquires a communication quality of the communication that is being conducted by the wireless communication module 140. Here, the "quality of a communication" (communication quality) includes a transmission quality, a connection quality, and a stability quality. Examples of the communication quality include a communication speed (for example, a communication speed, a delay, and a responsiveness), a stability (for example, a data loss rate and a reliability), and a coverage range. Specifically, acquisition of the communication quality corresponds to detecting a wireless communication speed, a reception level of a radio signal, an occurrence of disconnection of a wireless communication during the communication, or the like.

The switching determination module 130 determines whether a channel or transmission method having a higher communication quality than the communication quality of the communication that is being conducted has become able to communicate.

Here, the description "channel or transmission method having a higher communication quality than the communication quality of the communication that is being conducted" indicates, for example, a channel or transmission method which is more superior in the communication speed, the number of errors or the like than the channel or transmission method of the communication that is being currently conducted.

In addition, a "case where a channel B1 or a transmission method B2 has become able to communicate" represents a case where since a communication using the channel B1 or the transmission method B2 could not be selected at the time of starting a communication, the communication was conducted using another channel A1 or another transmission method A2, and during the communication, the channel B1 or the transmission method B2 has become able to communicate. Here, examples of the description "a communication using the channel B1 or the transmission method B2 could not be selected" include (i) a case where a communication by the channel B1 or the transmission method B2 has already been conducted and (ii) a case where a communication by the channel B1 or the transmission method B2 could not be conducted due to an error or the like.

In addition, the switching determination module 130 may determine whether to perform the switching, according to the remaining communication amount. Here, the description "according to a remaining communication amount" may indicate that a time required for the remaining communication when the communication by the current channel A1 or transmission method A2 is continued and a time required when a communication is started from the beginning by the channel B1 or the transmission method B2 that has become in a switchable state are compared to each other and it is determined that one of the former and the latter is shorter than the other.

If a channel or transmission method having a higher communication quality than the communication quality of the communication that is being conducted has become able to communicate, the transmission method/channel switching module 135 switches the communication that is being conducted to the channel or transmission method. That is, the communication is switched to a channel or transmission method having a higher communication quality, according to the result of the determination by the switching determination module 130 (the result of the determination as to whether a channel or transmission method having a higher communication quality than the communication quality of the communication that is being conducted has become able to communicate).

In addition, the transmission method/channel switching module 135 performs the switching according to the remaining communication amount. That is, switching between channels or transmission methods is performed, according to the result of the determination by the switching determination module 130 (the result of the determination as to whether to switch between communications according to the remaining communication amount).

In addition, when switching between transmission methods, the transmission method/channel switching module 135 may switch the transmission method to IEEE802.11ad.

Figure 2A:
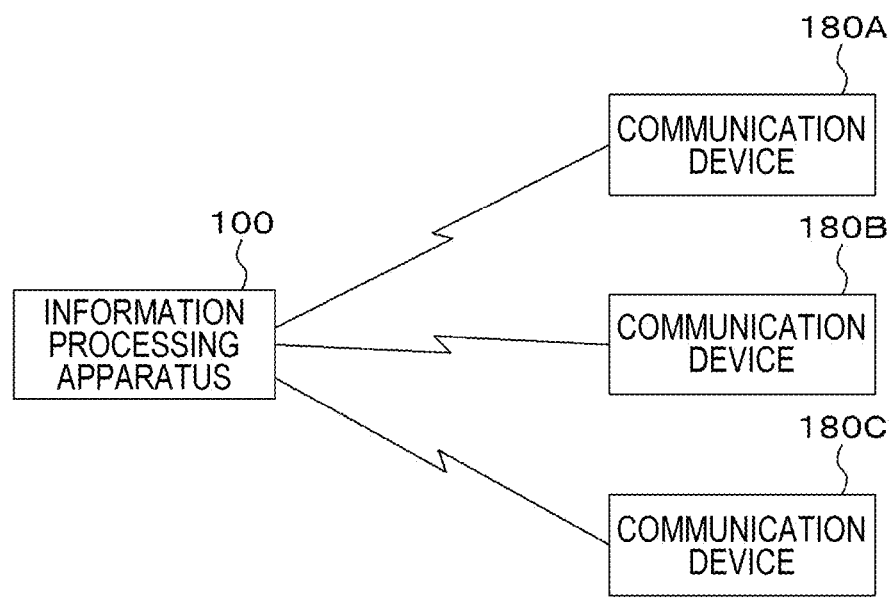
FIGS. 2A and 2B are explanatory views illustrating exemplary system configurations using the exemplary embodiment.
Figure 2B:
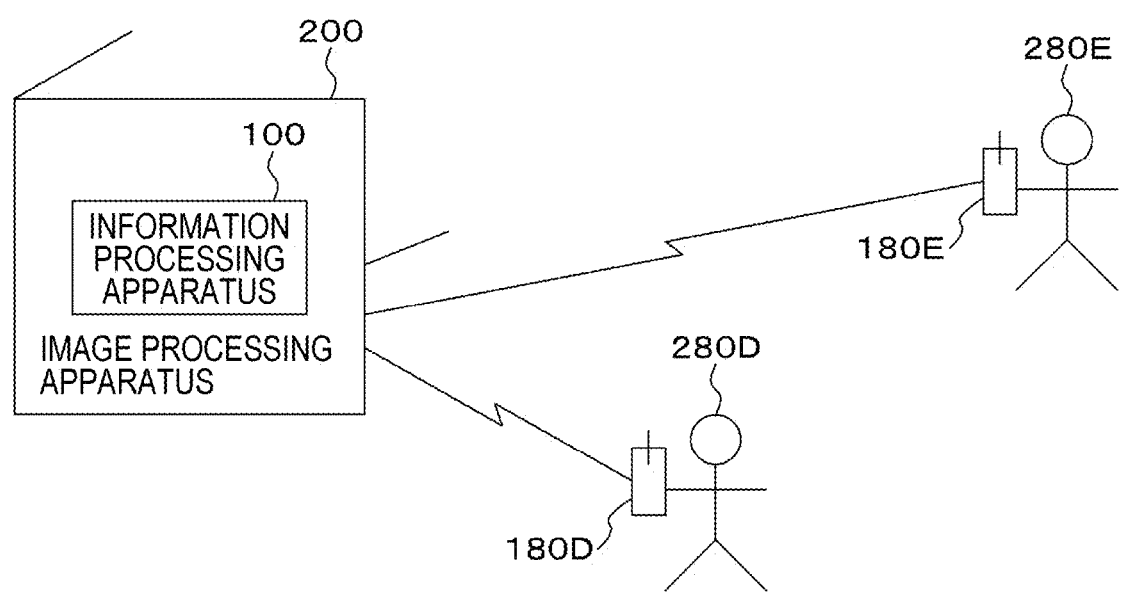

FIGS. 2A and 2B are explanatory views illustrating an exemplary system configuration using the present exemplary embodiment.

As illustrated in the example of FIG. 2A, the information processing apparatus 100 conducts a wireless communication with multiple communication devices 180 (communication devices 180A, 180B, and 180C). The wireless communication is conducted by a transmission method enabling the mutual communication between the information processing apparatus 100 and the communication devices 180. A channel is determined according to a predetermined algorithm at the time of starting the communication.

In the wireless communication, the communication quality may change during the communication. For example, the communication quality may change due to a usage environment, a congestion status, a malfunction, and the like. More specifically, the communication quality may change due to movement of an obstacle for a wireless communication (for example, an automobile, opening/closing of a door, and persons), movement of the information processing apparatus 100 or the communication devices 180 (for example, movement of the owner of the information processing apparatus 100 or the communication devices 180 when the information processing apparatus 100 or the communication devices 180 are mobile devices), use of another device (for example, a microwave oven and other communication devices), and traffics.

The information processing apparatus 100 conducts a communication using a transmission method and channel having the highest communication quality among the transmission methods and the channels using which the information processing apparatus 100 is capable of conducting a communication and the transmission methods and the channels using which the communication device 180 as a communication counterpart device is capable of conducting a communication.

Then, when a communication having a higher communication quality than the communication quality of the communication that is being conducted becomes possible, the information processing apparatus 100 switches the current communication to the transmission method and channel of the possible communication.

As illustrated in the example of FIG. 2B, an image processing apparatus 200 may have the information processing apparatus 100.

The image processing apparatus 200 is capable of conducting a wireless communication with a communication device 180D of a user 280D and a communication device 180E of a user 280E.

For example, the user 280D transmits a printing instruction to the image processing apparatus 200 by operating the communication device 180D and gets a printed matter from the image processing apparatus 200. In addition, the user 280E transmits a scanned image to the communication device 180E to store the image in the communication device 180E, by performing a scan operation with the image processing apparatus 200.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig: 310e, 11ac:310f, 11n:310g, 11g:310h, Bluetooth 310i, an antenna 320, a system memory 342, a hard disk 344, a USB device 346, an application specific integrated circuit (ASIC) 330, a user interface 332, a scanner 334, and a printer 336.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 may be shared. Further, multiple antennas 320 may be provided. The combination of the communication devices (communication chips) 310 and the antenna 320 is an implementing example of the wireless communication module 140 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac: 310c, WiGig:310d, WiGig:310e, 11ac:310f, 11n:310g, 11g: 310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
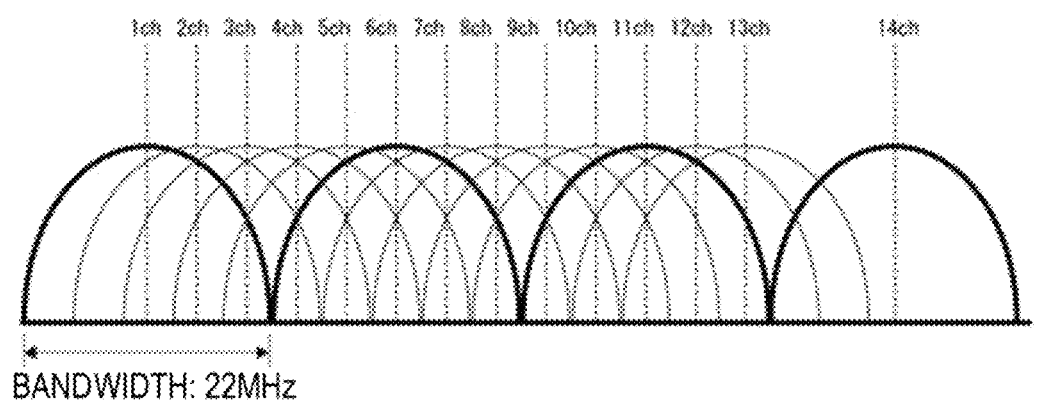
FIGS. 4A and 4B are explanatory views illustrating examples of channels.
Figure 4B:
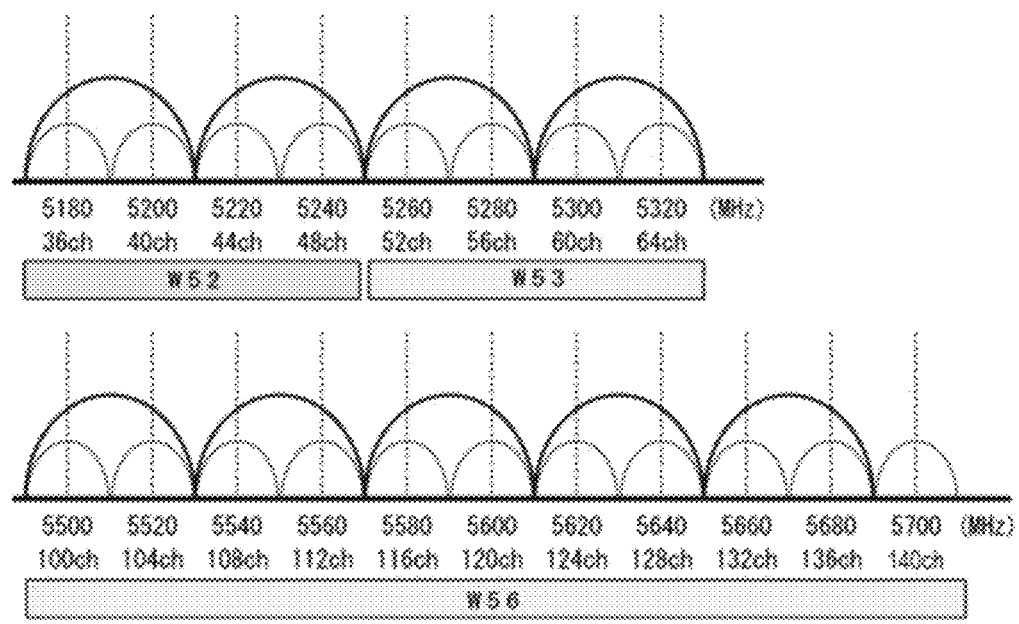

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch to another transmission method even during a communication.

In addition, it may be effective to switch to another channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz in Japan and Europe. The frequency band is divided into 11 channels of 1 ch to 11 ch each having the channel width of 20 MHz in the United States.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band in Japan, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present in Japan and Europe. Not illustrated in FIG. 4B, in IEEE802.11a/n/ac using the 5 GHz band, 24 channels are present in the United States. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching between the channels, a "channel bonding" function (a high speed mode) may be included. That is, as the switching between the channels, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching between the transmission methods, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
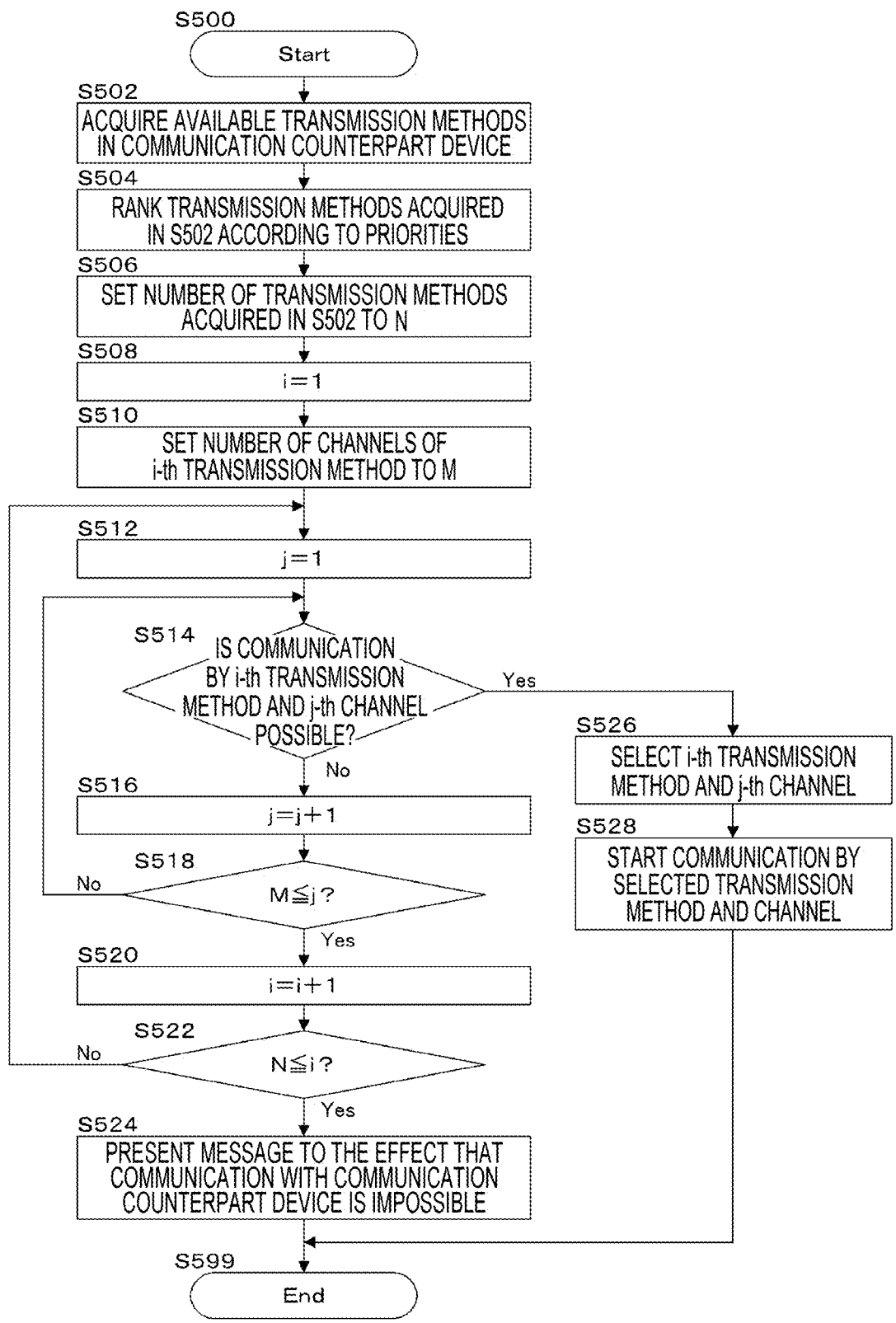
FIG. 5 is a flowchart illustrating an exemplary process by the exemplary embodiment.

FIG. 5 is a flowchart illustrating an exemplary process according to the present exemplary embodiment (mainly, the selection module 120). This process selects a transmission method and a channel in starting a communication.

In step S502, available transmission methods in the communication device 180 which is a communication counterpart device are acquired from the communication device information storage module 115. For example, the available transmission methods are acquired from an available transmission method column 650 of the communication counterpart device communication capability information table 600 stored in the communication device information storage module 115. FIG. 6 is an explanatory view illustrating an exemplary data structure of the communication counterpart device communication capability information table 600. The communication counterpart device communication capability information table 600 has a communication counterpart device ID column 610, a communication counterpart device name column 620, a communication counterpart device user column 630, a number of available transmission methods column 640, and an available transmission method column 650. The communication counterpart device ID column 610 stores information (communication counterpart device identifier (ID)) for uniquely identifying the communication device 180 which is the communication counterpart device in the present exemplary embodiment. The communication counterpart device name column 620 stores a name of the communication counterpart device. The communication counterpart device user column 630 stores a user who possesses the communication counterpart device (or a user who uses the communication counterpart device). The number of available transmission methods column 640 stores the number of transmission methods that are available in the communication counterpart device. The available transmission method column 650 stores available transmission methods in the communication counterpart device. The available transmission method column 650 stores transmission methods equal to the number of the available transmission methods in the number of available transmission methods column 640.

In step S504, the transmission methods acquired in step S502 are ranked according to priorities. For example, a priority table 700 or 800 stored in the communication device information storage module 115 is acquired as the priorities. Then, the available transmission methods in the communication device 180 which is the communication counterpart device are ranked according to the priority table 700 or 800.

Figure 7:
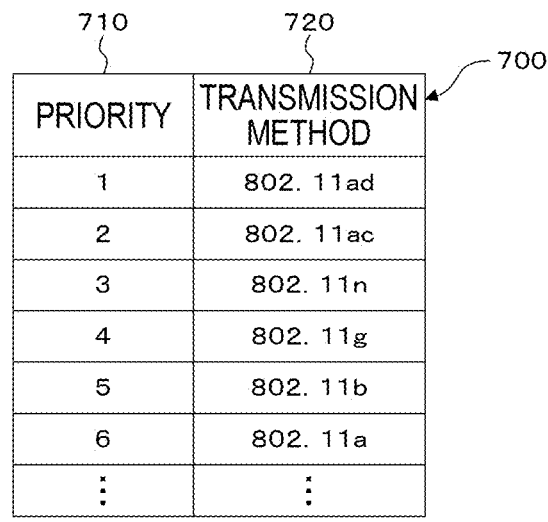
FIG. 7 is an explanatory view illustrating an exemplary data structure of a priority table.

FIG. 7 is an explanatory view illustrating an exemplary data structure of the priority table 700. The priority table 700 has a priority column 710 and a transmission method column 720. The priority column 710 stores priorities. The transmission method column 720 stores transmission methods corresponding to the priorities. In this example, priorities are assigned in an order of transmission speeds from the highest speed.

Figure 8:
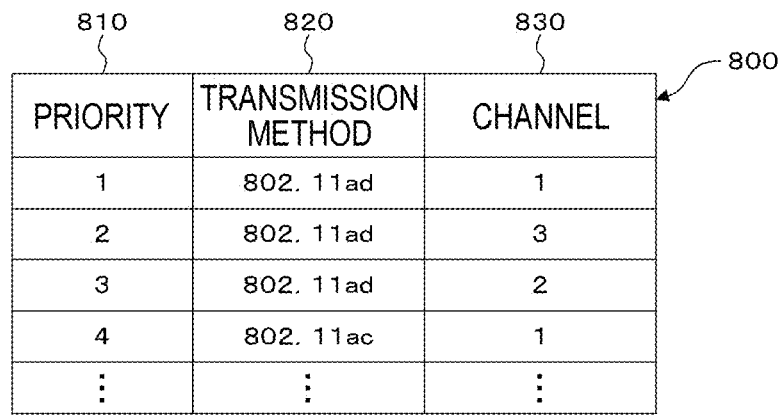
FIG. 8 is an explanatory view illustrating an exemplary data structure of a priority table.

FIG. 8 is an explanatory view illustrating an exemplary data structure of the priority table 800. The priority table 800 has a priority column 810, a transmission method column 820, and a channel column 830. The priority column 810 stores priorities. The transmission method column 820 stores transmission methods corresponding to the priorities. The channel column 830 stores channels corresponding to the priorities. The priority table 800 allows to select, for example, a combination of a transmission method and a channel which have a fast communication speed and cause the small number of communication errors. The number of communication errors may be calculated from past communication histories. In addition, the priority table 800 may include the combinations of the transmission methods and the channels that are ranked by a process of a flowchart illustrated in an example of FIG. 9.

In step S506, the number of the transmission methods acquired in step S502 is set to N. For example, the number of the transmission methods in the number of available transmission methods column 640 of the communication counterpart device communication capability information table 600 stored in the communication device information storage module 115 may be set to N.

In step S508, i=1 (1 is substituted into a variable i). Here, the variable i indicates a ranking of a transmission method.

In step S510, the number of channels of the i-th transmission method is set to M.

In step S512, j=1 (1 is substituted into a variable j). Here, the variable j indicates a ranking of a channel. If channels are assigned with no priorities (in the case of the ranking using the above-described priority table 700), the channels may be ranked in an arbitrary manner (for example, in an order of channel numbers).

In step S514, it is determined whether a communication by the i-th transmission method and the j-th channel is possible. If it is determined that the communication is possible, the process proceeds to step S526. Otherwise (for example, if the i-th transmission method and the j-th channel are being used in any of the information processing apparatus 100 and the communication device 180 or if an error occurs), the process proceeds to step S516.

In step S516, j=j+1 (the variable j is incremented). In step S518, it is determined whether M≤j. If it is determined that M≤j (if the determination has been made for all the channels in the i-th transmission method in step S514), the process proceeds to step S520. Otherwise, the process returns to step S514.

In step S520, i=i+1 (the variable i is incremented). In step S522, it is determined whether N≤i. If it is determined that N≤i (in a case where the determination has been made for all the available transmission methods in the target communication device 180 in step S514), the process proceeds to step S524. Otherwise, the process returns to step S512.

In step S524, a message is presented to the effect that the communication with the communication counterpart device is impossible. In addition, the communication may be set as communication standby in a queue.

In step S526, the i-th transmission method and the j-th channel are selected.

In step S528, the wireless communication module 140 starts a communication by the transmission method and channel selected in step S526. Thus, the communication is conducted by the transmission method and channel according to the priorities, among the transmission methods and the channels using which the communication device 180 and the information processing apparatus 100 are capable of communicating with each other.

Figure 9:
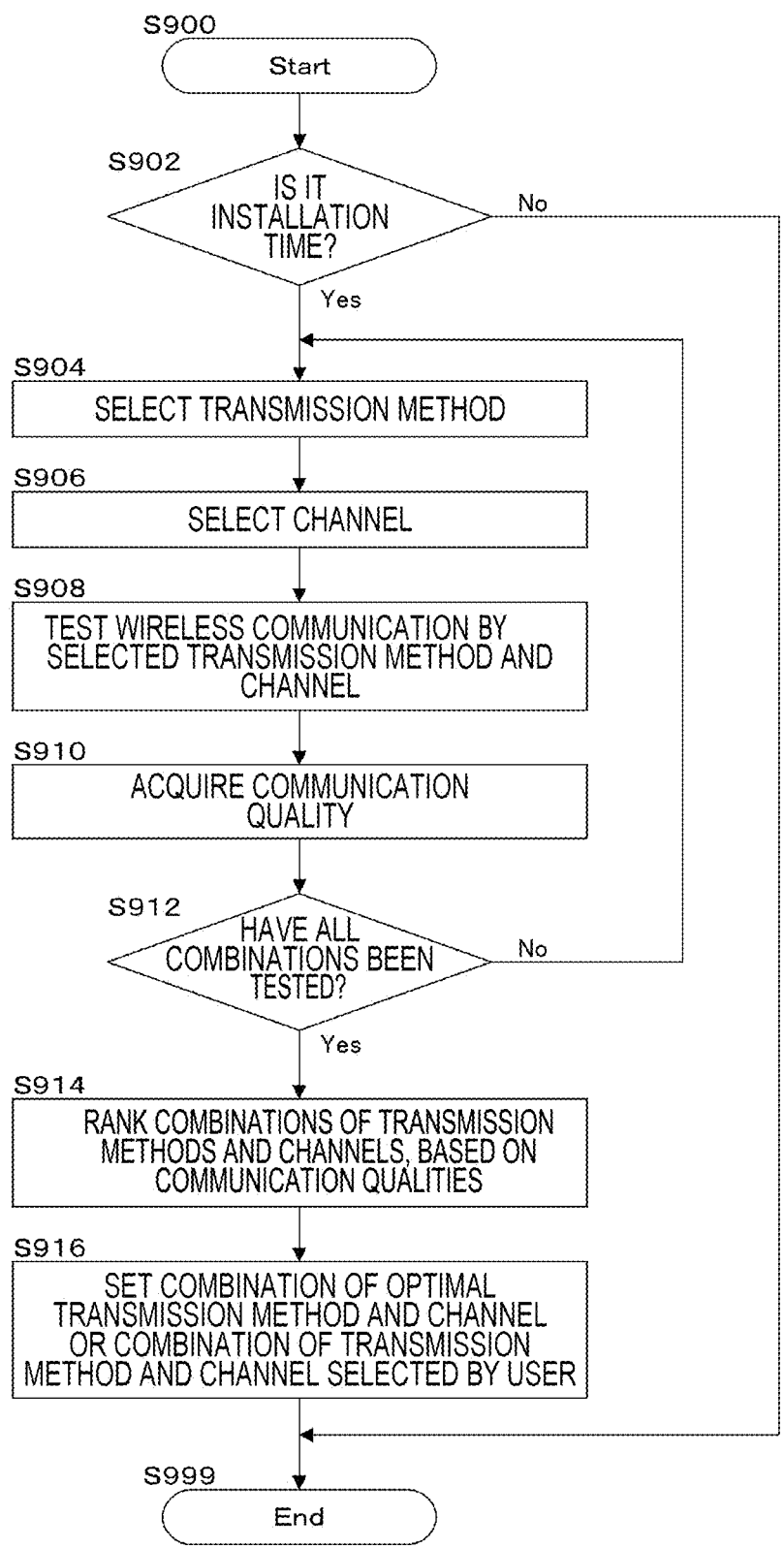
FIG. 9 is a flowchart illustrating an exemplary process by the exemplary embodiment.

FIG. 9 is a flowchart illustrating an exemplary process according to the present exemplary embodiment (information processing apparatus 100). When the information processing apparatus 100 is installed, the information processing apparatus 100 may automatically send a radio signal and receive a reception signal from a counterpart device by a diagnosis function (auto-diagnosis function) of the information processing apparatus 100, and may construct a combination of optimal transmission method and channel (may generate the priority table 800) according to the obtained detection data.

In step S902, it is determined whether it is an installation time of the information processing apparatus 100 (initial setting time). If it is determined that it is the installation time, the process proceeds to step S904. Otherwise, the process is ended (step S999). This is because main communication environments (place and area) are determined at the installation time of the information processing apparatus 100.

In step S904, a transmission method is selected. An order in which a target transmission method is selected from among multiple transmission methods may be determined in advance.

In step S906, a channel is selected. An order in which a target channel is selected from among multiple channels may be determined in advance.

In step S908, a test wireless communication is conducted by the transmission method and the channel selected in steps S904 and S906.

In step S910, the communication quality is acquired.

In step S912, it is determined whether all combinations have been tested. If it is determined that all the combinations have been tested, the process proceeds to step S914. Otherwise, the process returns to step S904.

In step S914, the combinations of the transmission methods and the channels are ranked based on the communication qualities. That is, a combination having a better communication quality ranks high. The result of the ranking is generated as the priority table 800.

In step S916, a combination of optimal transmission method and channel or a combination of a transmission method and a channel that are selected by a user is set. If there are multiple combinations of transmission methods and channels that have a higher communication quality than a predetermined value, a user may select one from the multiple combinations.

Figure 10:
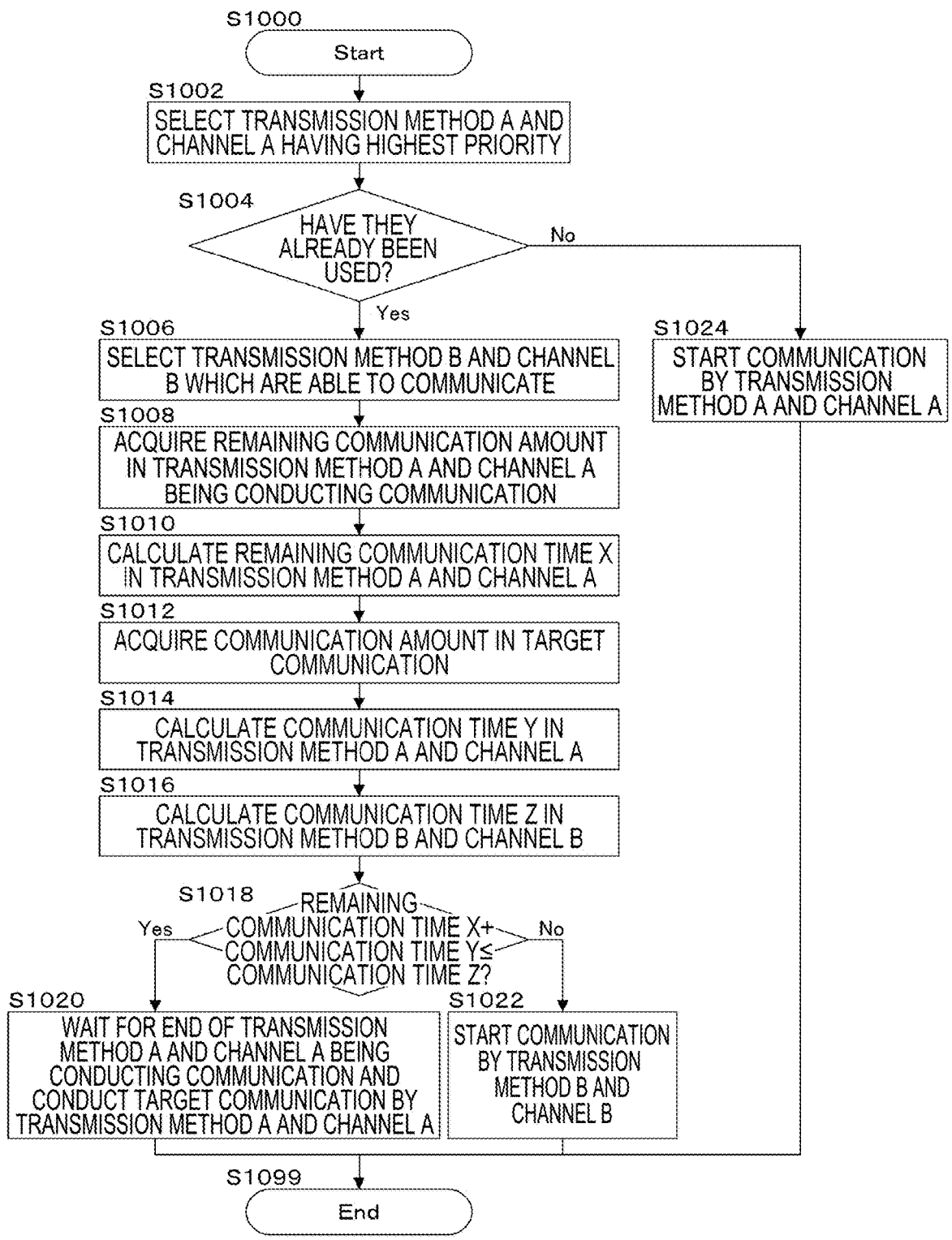
FIG. 10 is a flowchart illustrating an exemplary process by the exemplary embodiment.

FIG. 10 is a flowchart illustrating an exemplary process according to the present exemplary embodiment (mainly, the selection module 120). This process selects a transmission method and a channel in starting a communication (referred to as a "target communication" in the example of FIG. 10), and is different from the process of the flowchart illustrated in the example of FIG. 5.

In step S1002, a transmission method A and a channel A which have the highest priority are selected. Specifically, among the transmission methods and the channels using which a communication between the information processing apparatus 100 and the communication device 180 is possible (merely the possibility is sufficient), a transmission method and a channel which have the highest priority may be selected from the priority table 700 or 800.

In step S1004, it is determined whether the selected transmission method A and channel A have already been used in the information processing apparatus 100 or the communication device 180. If it is determined that the transmission method A and the channel A have already been used, the process proceeds to step S1006. Otherwise, the process proceeds to step S1024.

In step S1006, a transmission method B and a channel B which are able to communicate are selected. Specifically, a transmission method and a channel using which a communication between the information processing apparatus 100 and the communication device 180 is possible (it is only required to be able to actually conduct the communication) may be selected. For example, a transmission method and a channel which have the second highest priority after the transmission method A and the channel A may be selected.

In step S1008, a remaining communication amount of the communication that is being conducted using the transmission method A and the channel A is acquired. This process aims to calculate a remaining communication time X (so-called standby time) until the communication using the transmission method A and the channel A is ended.

In step S1010, the remaining communication time X in the transmission method A and the channel A is calculated. A nominal value of the communication speed in the transmission method A may be used, or a performance of the communication speed in the transmission method A and the channel A may be used.

In step S1012, a communication amount of the target communication is acquired. This process aims to calculate a communication time Y in the transmission method A and the channel A and a communication time Z in the transmission method B and the channel B.

In step S1014, the communication time Y in the transmission method A and the channel A is calculated. A nominal value of the communication speed in the transmission method A may be used, or a performance of the communication speed in the transmission method A and the channel A may be used.

In step S1016, the communication time Z in the transmission method B and the channel B is calculated. A nominal value of the communication speed in the transmission method B may be used, and a performance of the communication speed in the transmission method B and the channel B may be used.

In step S1018, it is determined whether "remaining communication time X+communication time Y≤communication time Z." If it is determined that "remaining communication time X+communication time Y≤communication time Z," the process proceeds to step S1020. Otherwise, the process proceeds to step S1022. Here, the "remaining communication time X+communication time Y" indicates a time until a communication is completed in a case where the communication is conducted by the transmission method A and the channel A, that is, in a case where a communication is conducted by the transmission method A and the channel A after standing by until the communication that is being conducted by the communication A and the channel A is ended. This is because it may be beneficial to stand by until the transmission method A and the channel A become free in a case where the communication speed of the transmission method A and the channel A is faster than that of the transmission method B and the channel B and the communication capability of the target communication is large. For example, if the transmission method A is IEEE802.11ad and if a high resolution image or the like is transmitted, it may be beneficial to wait for the transmission method A.

In step S1020, the wireless communication module 140 waits for the end of the transmission method A and the channel A that are being conducting a communication, and conducts the target communication by the transmission method A and the channel A.

In step S1022, the wireless communication module 140 conducts a communication by the transmission method B and the channel B.

In step S1024, the wireless communication module 140 starts a communication by the transmission method A and the channel A.

Figure 11:
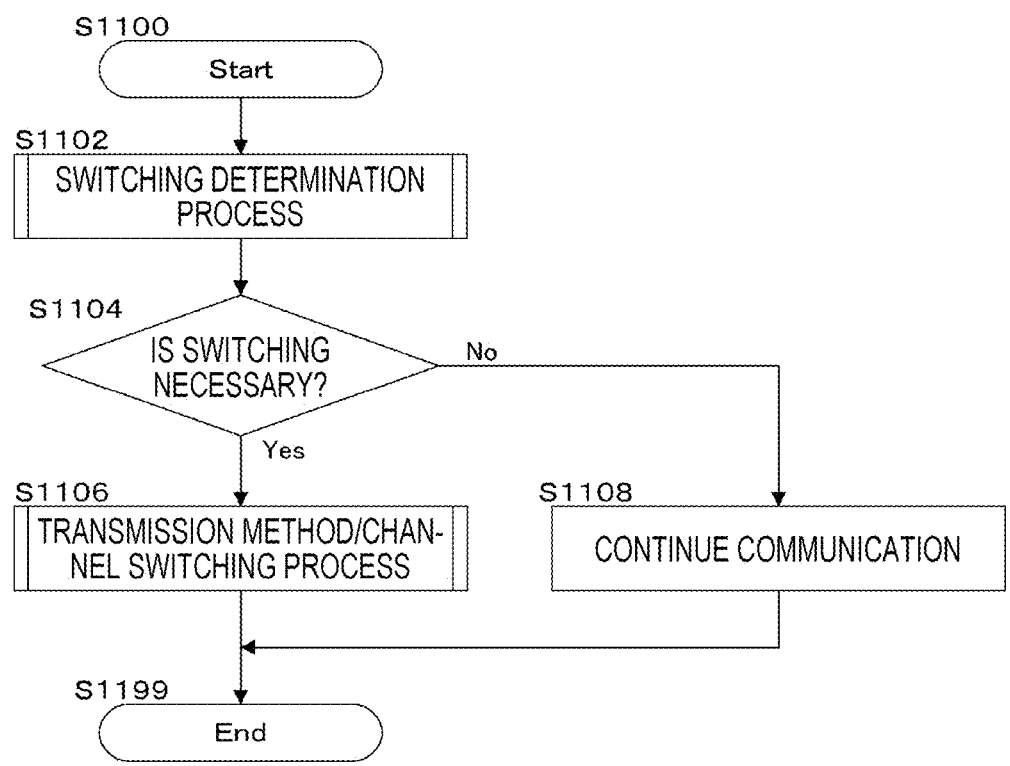
FIG. 11 is a flowchart illustrating an exemplary process by the exemplary embodiment.

FIG. 11 is a flowchart illustrating an exemplary process by the present exemplary embodiment. This process is a switching process performed during a communication.

In step S1102, the switching determination module 130 performs a switching determination process. A detailed process of step S1102 will be described later using a flowchart illustrated in an example of FIG. 12 or 14.

In step S1104, it is determined whether a switching is necessary, as a result of the process in step S1102. If it is determined that a switching is necessary, the process proceeds to step S1106. Otherwise, the process proceeds to step S1108.

In step S1106, the transmission method/channel switching module 135 performs a transmission method/channel switching process. A detailed process of step S1106 will be described later using the flowchart illustrated in an example of FIG. 13.

In step S1108, the wireless communication module 140 continues the communication by the current transmission method and channel.

Figure 12:
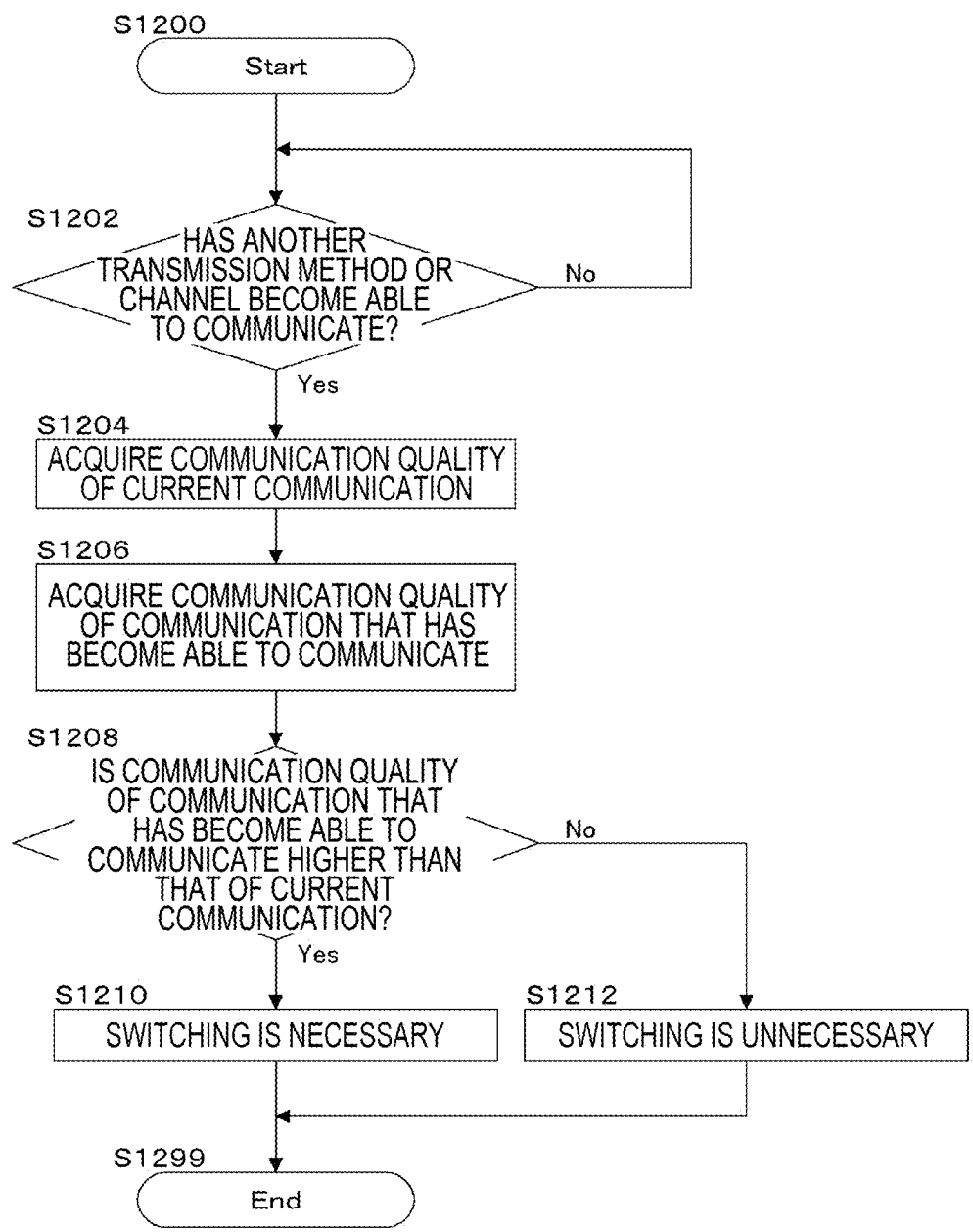
FIG. 12 is a flowchart illustrating an exemplary process according to the exemplary embodiment.

FIG. 12 is a flowchart illustrating an exemplary process according to the present exemplary embodiment (switching determination module 130).

In step S1202, it is determined whether another transmission method or channel has become able to communicate. If it is determined that another transmission method or channel has become able to communicate, the process proceeds to step S1204. Otherwise, the process stands by until another transmission method or channel becomes able to communicate. In step S1308 of a flowchart illustrated in an example of FIG. 13, a communication is started by the "other transmission method or channel" which is determined in step S1202 to have become able to communicate.

In step S1204, the communication quality of the current communication is acquired.

In step S1206, the communication quality of the communication that has become able to communicate (the communication by the "other transmission method or channel") is acquired. As described above, if the communication by the "other transmission method or channel" has been conducted until that time, the communication quality in the communication performance may be acquired. If a communication itself could not be conducted, a nominal value in the communication by the "other transmission method or channel" may be acquired as the communication quality.

In step S1208, it is determined whether the communication quality of the communication that has become able to communicate is higher than the communication quality of the current communication. If the determination is Yes, the process proceeds to step S1210. Otherwise, the process proceeds to step S1212.

In step S1210, it is determined that a switching is necessary.

In step S1212, it is determined that a switching is unnecessary.

Figure 13:
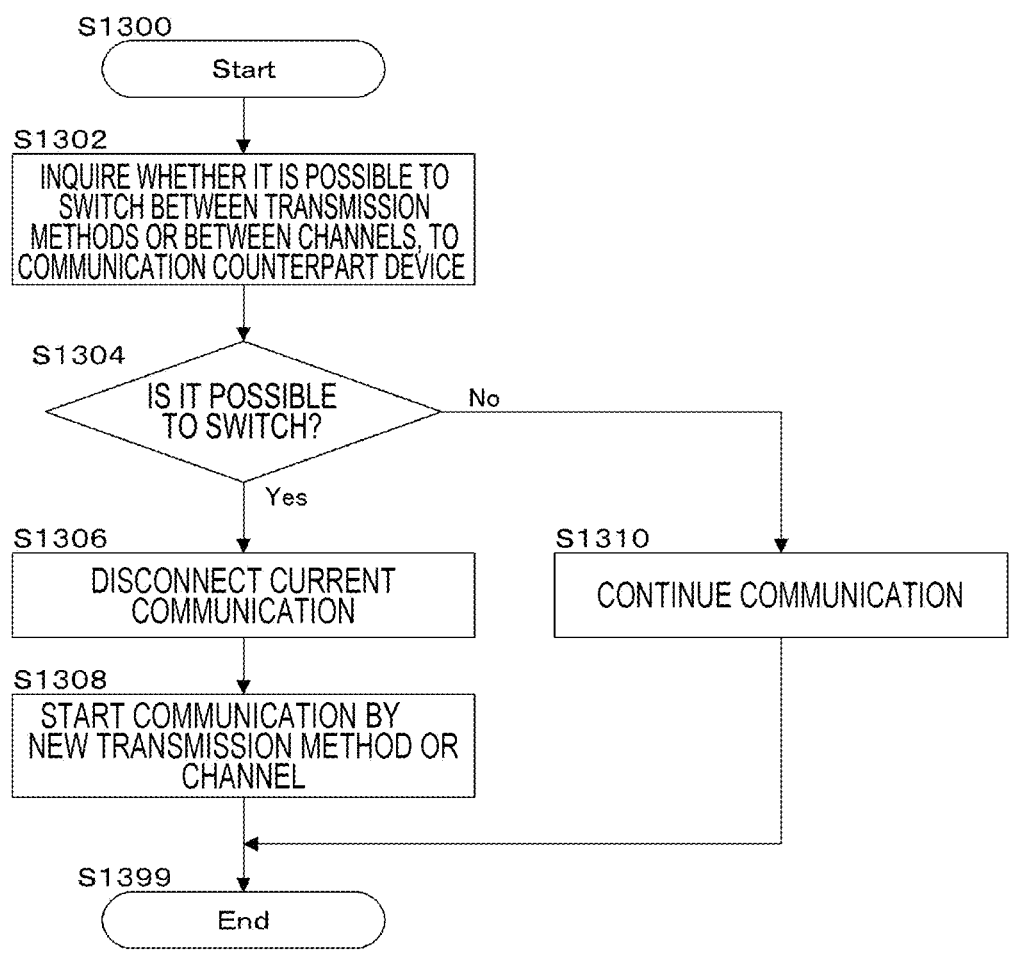
FIG. 13 is a flowchart illustrating an exemplary process according to the exemplary embodiment.

FIG. 13 is a flowchart illustrating an exemplary process according to the present exemplary embodiment (transmission method/channel switching module 135).

In step S1302, it is inquired whether it is possible to switch between transmission methods or between channels, to the communication device 180 which is the communication counterpart device.

In step S1304, it is determined whether a reply from the communication device 180 indicates that it is possible to switch between transmission methods or between channels. If it is determined that the reply indicates it is possible to switch between the transmission methods or between the channels, the process proceeds to step S1306. Otherwise, the process proceeds to step S1310.

In step S1306, the current communication is disconnected.

In step S1308, a communication is started by the new transmission method or channel. For example, a communication may be started from the beginning by the new transmission method or channel, or the remaining communication may be conducted by the new transmission method or channel.

In step S1310, the wireless communication module 140 continues the current communication.

Figure 14:
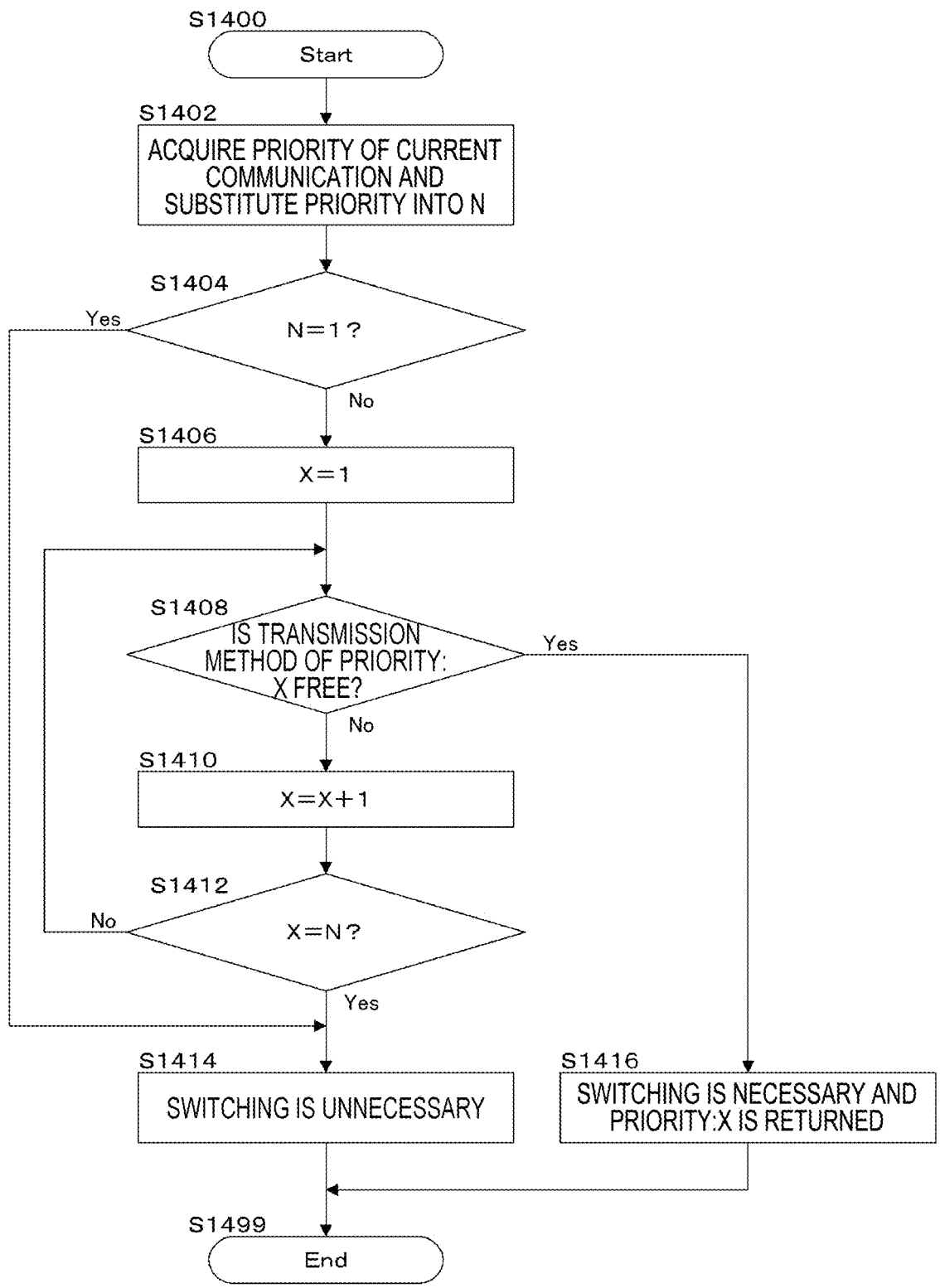
FIG. 14 is a flowchart illustrating an exemplary process according to the exemplary embodiment.

FIG. 14 is a flowchart illustrating an exemplary process according to the present exemplary embodiment (switching determination module 130).

In step S1402, a priority of the current communication is acquired and the acquired value is substituted into a value of the variable N.

In step S1404, it is determined whether N=1 (the variable N is 1). If it is determined that N=1, the process proceeds to step S1414. Otherwise, the process proceeds to step S1406.

In step S1406, X=1 (1 is substituted into the variable X).

In step S1408, it is determined whether the transmission method of the priority:X is free (is able to communicate). If it is determined that the transmission method is free, the process proceeds to step S1416. Otherwise, the process proceeds to step S1410. Here, the "transmission method of the priority:X" is extracted using the priority table 700 or 800.

In step S1410, X=X+1 (the variable X is incremented). In step S1412, it is determined whether X=N (values of the variables X and N are equal to each other). If it is determined that X=N (if all transmission methods having higher priorities than that of the current communication are investigated), the process proceeds to step S1414. Otherwise, the process returns to step S1408.

In step S1414, it is determined that a switching is unnecessary.

In step S1416, a switching is necessary, and the priority:X is returned. In step S1308 of the flowchart illustrated in the example of FIG. 13, a new communication is started by the transmission method and the channel of the priority X.

Figure 15:
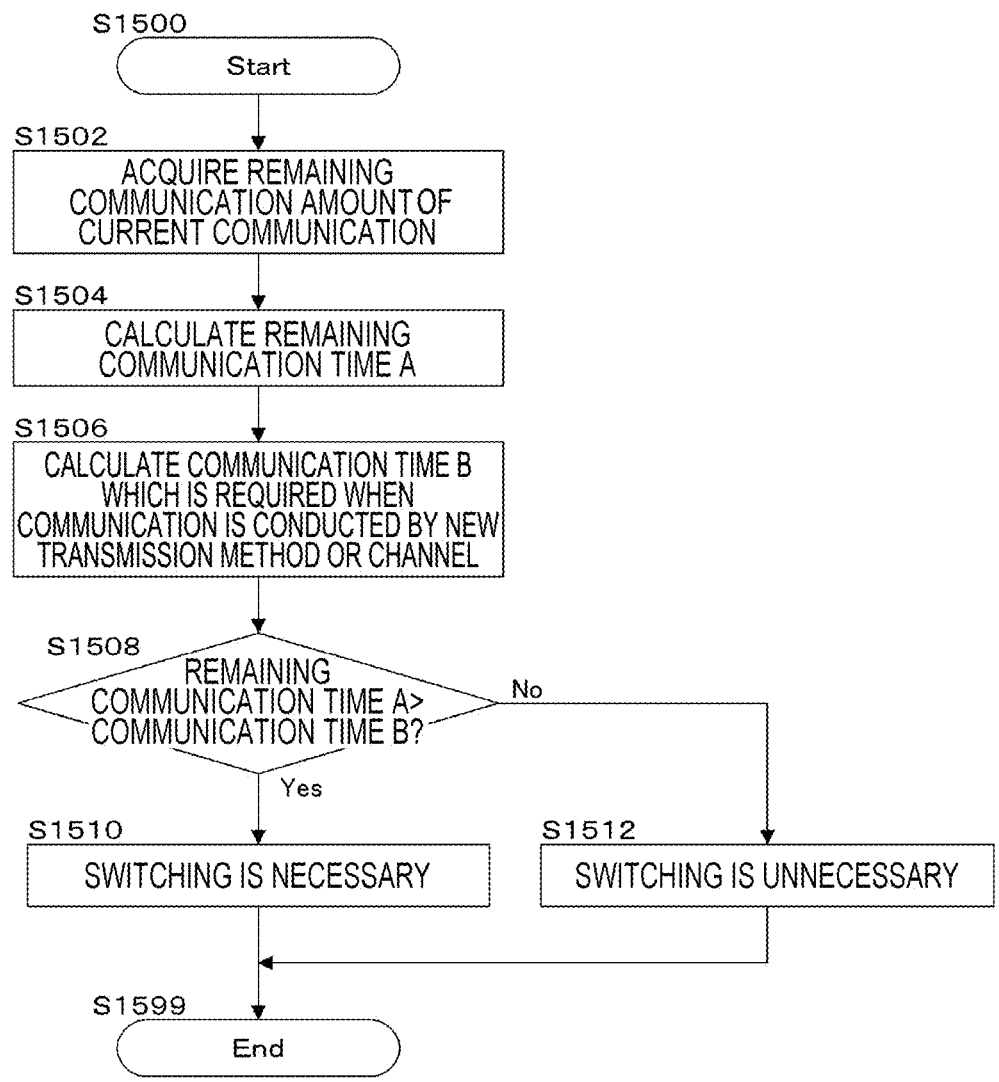
FIG. 15 is a flowchart illustrating an exemplary process according to the exemplary embodiment.

FIG. 15 is a flowchart illustrating an exemplary process according to the present exemplary embodiment (switching determination module 130).

Instead of performing step S1210 of the flowchart illustrated in the example of FIG. 12, the process of the flowchart illustrated in the example of FIG. 15 may be performed.

Also, instead of performing step S1416 of the flowchart illustrated in the example of FIG. 14, the process of the flowchart illustrated in the example of FIG. 15 may be performed. It should be noted that in step S1510, "a switching is necessary and the priority:X is returned".

In step S1502, a remaining communication amount of the current communication is acquired.

In step S1504, a remaining communication time A is calculated using the remaining communication amount and the communication speed (a nominal value or a performance value) of the transmission method or channel.

In step S1506, a communication time B which is required when a communication is conducted by the new transmission method or channel is calculated. For example, if the communication is conducted again from the beginning by the new transmission method or channel, the communication time B is calculated using the communication capacity and the communication speed (a nominal value or a performance value) of the new transmission method or channel. If the remaining communication is conducted by the new transmission method or channel, the communication time B is calculated using the remaining communication amount and the communication speed (a nominal value or a performance value) of the new transmission method or channel.

In step S1508, it is determined whether "remaining communication time A>communication time B." If it is determined that "remaining communication time A>communication time B" (if the communication is completed relatively fast when the communication is switched to the new transmission method or channel), the process proceeds to step S1510. Otherwise, the process proceeds to step S1512.

In step S1510, it is determined that a switching is necessary.

In step S1512, it is determined that a switching is unnecessary.

Figure 16:
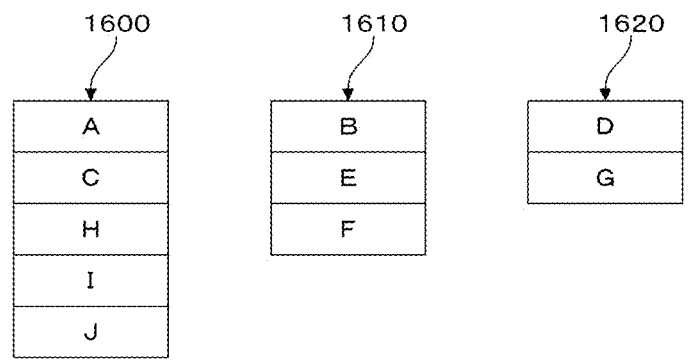
FIG. 16 is an explanatory view illustrating an exemplary data structure of an 11ad queue used in the exemplary embodiment.

FIG. 16 is an explanatory view illustrating an exemplary data structure of an 11ad queue 1600 used in the present exemplary embodiment.

The information processing apparatus 100 uses queues in order to communicate with the communication devices 180 the number of which exceeds the number of communication devices with which the information processing apparatus 100 is capable of communicating at the same time (for example, broadcasting). That is, a communication job that is in a communication standby state may be set in a queue, and if the communication device 180 becomes able to communicate (if the communication that is being conducted is ended), the communication job may be taken out from the queue and started. In the information processing apparatus 100, a queue may be provided for each communication device (communication chip) 310. For example, as illustrated in FIG. 16, there are provided an 11ad queue 1600 for a communication device (communication chip) 310 of IEEE802.11ad, an 11ac queue 1610 for a communication device (communication chip) 310 of IEEE802.11ac, and an 11n queue 1620 for a communication device (communication chip) 310 of IEEE802.11n.

The 11ad queue 1600 includes communication jobs A, C, H, I, and J in this order as standby communication jobs.

The 11ac queue 1610 includes communication jobs B, E, and F in this order as standby communication jobs.

The 11n queue 1620 includes communication jobs D and G in this order as standby communication jobs.

Descriptions will be made on a process of completing the entire communication, including the communication jobs accommodated in the queues, in short time with reference to FIGS. 17 and 18. That is, this process is intended to effectively use multiple communication devices (communication chips) 310.

Here, a queue is provided for each transmission method of a wireless communication of the communication device 180 which is the communication counterpart device, and communication jobs for each queue are processed.

In this case, a communication job stands by in a queue until a previous communication job is completed.

Figure 17:
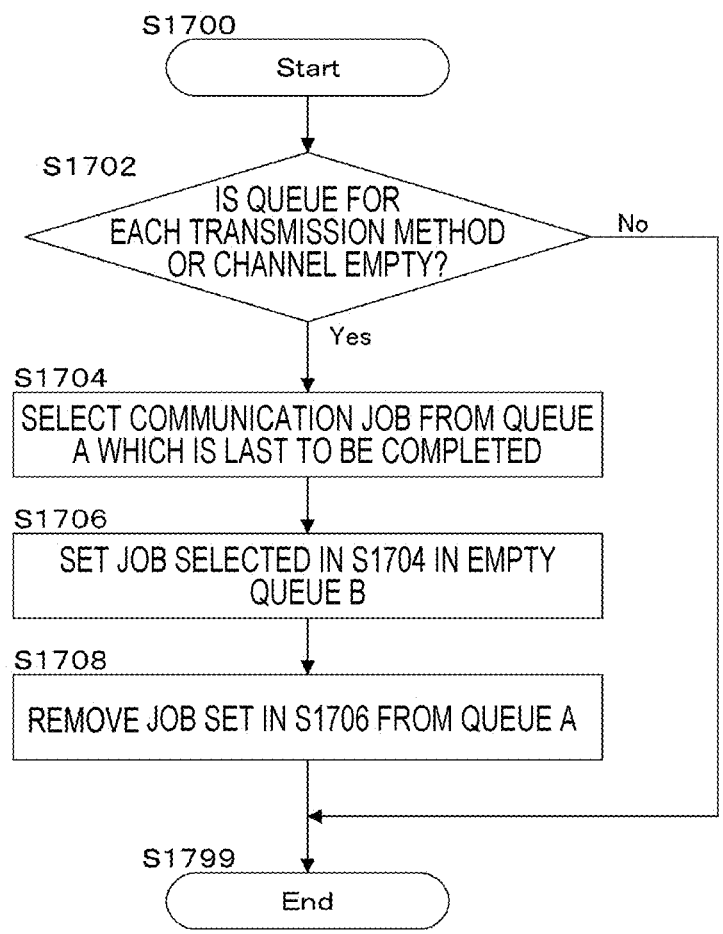
FIG. 17 is a flowchart illustrating an exemplary process according to the exemplary embodiment.

FIG. 17 is a flowchart illustrating an exemplary process according to the present exemplary embodiment.

In step S1702, it is determined whether a queue for each transmission method or channel (or for each communication device (communication chip) 310) is empty. If it is determined that the queue is empty (if the communication by the transmission method or channel is ended and if the transmission method or channel becomes able to communicate), the process proceeds to step S1704. Otherwise, the process is ended (step S1799).

In step S1704, a communication job is selected from a queue A which is the last to be completed.

In step S1706, the job selected in step S1704 is set in an empty queue B.

In step S1708, the job set in step S1706 is removed from the queue A.

For example, in the example illustrated in FIG. 16, if the 11ad queue 1600 has become empty due to the fast communication speed but the communication jobs E and F have been left in the 11ac queue 1610, the communication job F is moved from the 11ac queue 1610 to the 11ad queue 1600. In this way, the entire communication, including the standby communication jobs, may be completed in short time.

In addition, the transmission method of the queue of the movement destination of the communication job may not be faster than the transmission method of the queue of the movement source. Even if the transmission method of the empty queue is slow, the communication resource may be used.

In addition, it may be determined whether to move a communication job so as to make the communication completion time earlier, by comparing a communication completion time which is required when the transmission is performed by the transmission method of the queue of the movement destination with a communication completion time which is required when the transmission is performed by the transmission method of the original queue without the communication job being moved, based on an amount of data to be transmitted in a communication job which is a movement candidate.

Figure 18:
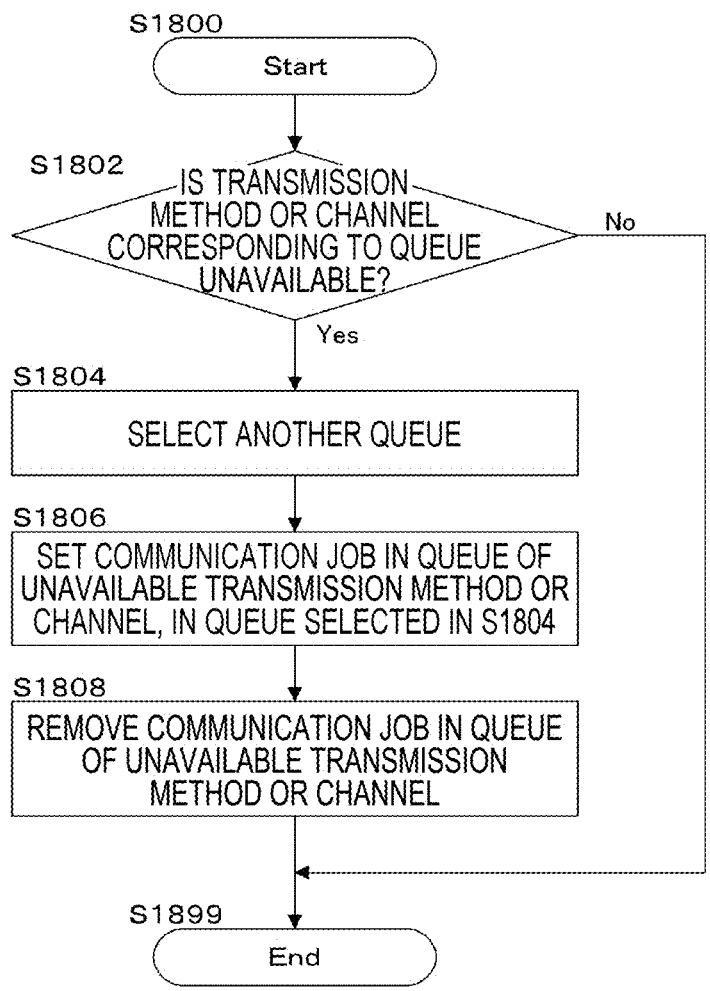
FIG. 18 is a flowchart illustrating an exemplary process according to the exemplary embodiment.

FIG. 18 is a flowchart illustrating an exemplary process according to the present exemplary embodiment. This process is a communication process using queues and is intended to deal with a failure or the like of the communication device (communication chip) 310.

In step S1802, it is determined whether a transmission method or channel (or a communication device (communication chip) 310) corresponding to a queue is unavailable. If it is determined that the transmission method or channel is unavailable (for example, a communication is disconnected due to a failure), the process proceeds to step S1804. Otherwise, the process is ended (step S1899).

In step S1804, another queue is selected. For example, an empty queue may be selected. In addition, for example, a completion time of each queue may be calculated, and a queue which is the first to be completed may be selected. In addition, other multiple queues may be selected. For example, queues and jobs to be set may be selected such that the completion times of the queues become equal to each other. Meanwhile, then, queues and jobs to be set may be selected such that the completion time of the jobs in the queue which is determined to be unavailable is maintained. Specifically, a completion time when jobs are temporarily set in a queue may be calculated, and queues and jobs may be selected such that the order of the jobs according to the completion time is identical with the order of the jobs in the original queue.

In step S1806, the communication jobs in the queue of the transmission method or channel which is determined to be unavailable are set in the queue selected in step S1804.

In step S1808, the communication jobs in the queue of the transmission method or channel which is determined to be unavailable are removed.

In addition, if the unavailable transmission method or channel (or the communication device (communication chip) 310) is restored/revived, the transmission method or channel returns to the original state. That is, the moved communication jobs (excluding a communication job communication of which has been ended and a communication job communication of which has been started) are moved to the restored/revived queue.

Figure 19:
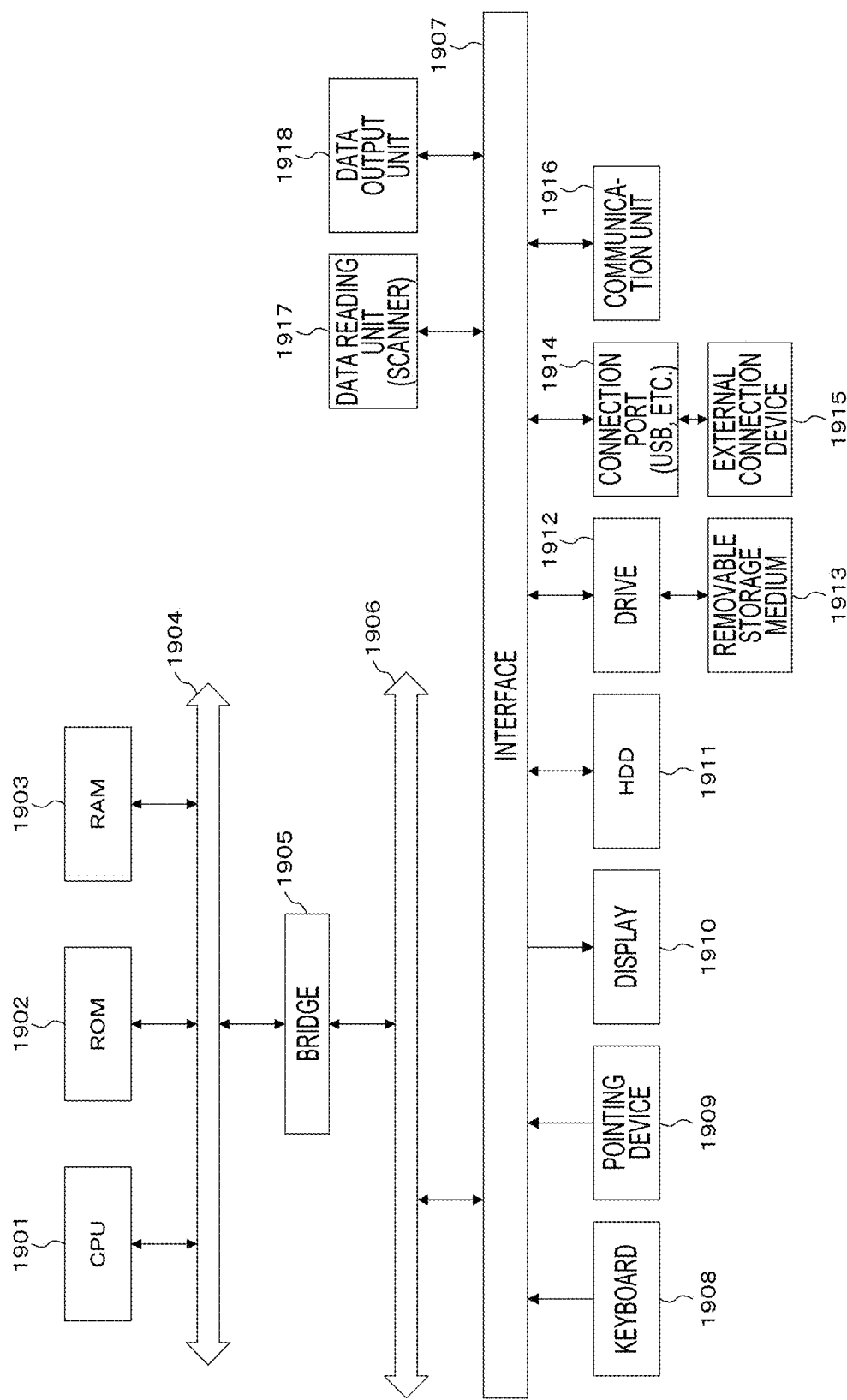
FIG. 19 is a block diagram illustrating an exemplary hardware configuration of a computer implementing the exemplary embodiment.

An exemplary hardware configuration of the information processing apparatus of the present exemplary embodiment will be described with reference to FIG. 19. FIG. 19 illustrates an example of a hardware configuration which is configured with, for example, a personal computer (PC) or the like and includes a data reading unit 1917 such as a scanner and a data output unit 1918 such as a printer. In addition, while the example illustrated in FIG. 3 represents the configuration mainly serving as a chip using the ASIC or the like, the example illustrated in FIG. 19 mainly represents a functional configuration that is implemented with a personal computer or the like. For example, a CPU 1901 takes in charge of the functions of the SoC 300 and the ASIC 330.

The CPU 1901 is a controller that performs processes according to a computer program describing an execution sequence of each of the various modules described in the above-described exemplary embodiment, that is, the communication control module 110, the selection module 120, the communication quality acquisition module 125, the switching determination module 130, the transmission method/channel switching module 135, the wireless communication module 140 and the like.

A ROM (Read Only Memory) 1902 stores programs, arithmetic parameters or the like used by the CPU 1901. A RAM 1903 stores programs used in the execution by the CPU 1901, parameters appropriately varying in the execution and the like. The CPU 1901, the ROM 1902, and the RAM 1903 are interconnected by a host bus 1904 including a CPU bus or the like.

The host bus 1904 is connected to an external bus 1906 such as a peripheral component interconnect/interface (PCI) via a bridge 1905.

A keyboard 1908 and a pointing device 1909 such as a mouse are devices operated by an operator. A display 1910 is, for example, a liquid crystal display device or a cathode ray tube (CRT), and displays various types of information as texts and image information. In addition, a touch screen or the like having the functions of both the pointing device 1909 and the display 1910 may be used. In this case, the function of the keyboard may be implemented by drawing the keyboard using software (also called a so-called software keyboard, screen keyboard or the like) on the screen (the touch screen), without the physical connection as in the keyboard 1908.

A hard disk drive (HDD) 1911 is equipped with a hard disk (which may be a flash memory or the like) therein, drives the hard disk, and stores or plays programs or information executed by the CPU 1901. The hard disk has functions such as the communication device information storage module 115 and stores the communication counterpart device communication capability information table 600, the priority tables 700 and 800, the 11ad queue 1600, communication contents and the like. Further, in the hard disk, other various data and various computer programs are stored.

A drive 1912 reads data or programs stored in a removable storage medium 1913 such as a mounted magnetic disc, an optical disc, a magneto-optical disc, or a semiconductor memory, and supplies the data or programs to the interface 1907, the external bus 1906, the bridge 1905, and the RAM 1903 connected via the host bus 1904. In addition, the removable storage medium 1913 may also be used as a data storing area.

A connection port 1914 is a port for connection of an external connection device 1915, and includes connection units such as USB and IEEE1394. The connection port 1914 is connected to the CPU 1901 and the like via the interface 1907, the external bus 1906, the bridge 1905, the host bus 1904 and the like. A communication unit 1916 is connected to a communication line and performs a process of a data communication with an external device. The data reading unit 1917 is, for example, a scanner and performs a document reading process. The data output unit 1918 is, for example, a printer and performs a process of outputting document data.

The hardware configuration of the information processing apparatus illustrated in FIG. 19 represents an exemplary configuration. The present exemplary embodiment is not limited to the configuration illustrated in FIG. 19, and may be any configuration that may execute the modules described in the present exemplary embodiment. For example, some of the modules may be configured with dedicated hardware (e.g., application specific integrated circuit (ASIC)), and some of the modules may be in the form in which the modules are present in an external system and connected via a communication line. Further, the multiple systems illustrated in FIG. 19 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copying machine, a facsimile, a scanner, a printer, a multifunctional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, if the communication quality is not improved even by changing a transmission method, the channel may be switched to another channel. Here, specifically, the case where the "communication quality is not improved" corresponds to (i) a case where a difference between values of the communication quality before and after the transmission method switching is within a predetermined value or (ii) a case where the communication quality after switching between the transmission methods is worse than that before switching between the transmission methods.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The above-described exemplary embodiment may be construed as described below.

[A1] An information processing apparatus including:
a communication unit configured to conduct a wireless communication using plural transmission methods, at least one of which has plural channels; and
a switching unit, in which when a channel or transmission method having a higher communication quality than that of a communication that is being conducted has become able to communicate, the switching unit switches to the channel or the transmission method having the higher communication quality.

[A2] The information processing apparatus according to [A1], in which the switching unit is configured to perform the switching according to a remaining communication amount.

[A3] The information processing apparatus according to [A1], in which the switching unit is configured to switch a transmission method to IEEE802.11ad.

[A4] A non-transitory computer readable storage medium storing an information processing program that, when executed, causes a computer to function as:
a communication unit configured to conduct a wireless communication using plural transmission methods, at least one of which has plural channels; and
a switching unit, in which when a channel or transmission method having a higher communication quality than that of a communication that is being conducted has become able to communicate, the switching unit switches to the channel or the transmission method having the higher communication quality.

The above-described modified exemplary embodiments may have the following effects.

With the information processing apparatus of [A1], when a channel or transmission method is switched according to a communication quality of a communication that is being conducted, a channel may be preferentially switched.

With the information processing apparatus of [A2], a switching may be performed according to a remaining communication amount.

With the information processing apparatus of [A3], a transmission method may be switched to IEEE802.11ad.

With the information processing program of [A4], when a channel or transmission method is switched according to a communication quality of a communication that is being conducted, a channel may be preferentially switched.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
conduct a wireless communication with one of a plurality of wireless devices using a plurality of transmission methods, at least one of which has a plurality of channels; and
change a currently established wireless communication with the one of the plurality of wireless devices with respect to at least one of a plurality of pairs of a transmission method and a channel according to:
(i) a predetermined selection order of the transmission methods and the channels,
(ii) a transmission method or a channel provided in a communication counterpart device which is the one of the plurality of wireless devices, and
(iii) comparison between
an estimated first amount of time that is calculated to be taken, to complete communicating a remaining amount of the wireless communication and complete communicating a target amount of the wireless communication, using a first pair of a transmission method and a channel, and
an estimated second amount of time that is calculated to be taken to complete communicating the target amount of the wireless communication using a second pair, different than the first pair, of a transmission method and a channel,
wherein the first pair is switched to the second pair to be used by the information processing apparatus in response to the first amount of time being larger than the second amount of time.

2. The information processing apparatus according to claim 1, wherein the processor is programmed to:
communicate with the plurality of wireless devices comprising a plurality of communication counterpart devices; and
separately select at least one of a transmission method and a channel to be used in a wireless communication with each of the communication counterpart devices.

3. The information processing apparatus according to claim 1, wherein the processor is programmed to:
when predetermined transmission method and channel provided in the information processing apparatus match predetermined transmission method and channel provided in the communication counterpart device, and when one or both of (i) the predetermined transmission method and channel provided in the information processing apparatus and (ii) the predetermined transmission method and channel provided in the communication counterpart device are unavailable, stand by until both (i) and (ii) become available or select another transmission method and another channel.

4. The information processing apparatus according to claim 3, wherein the predetermined transmission method and channel are a transmission method and a channel which have a highest communication quality.

5. A non-transitory computer readable medium storing an information processing program that, when executed, causes a computer to:
conduct a wireless communication with one of a plurality of wireless devices using a plurality of transmission methods, at least one of which has a plurality of channels; and
change a currently established wireless communication with the one of the plurality of wireless devices with respect to at least one of a plurality of pairs of a transmission method and a channel according to:
(i) a predetermined selection order of the transmission methods and the channels,
(ii) a transmission method or a channel provided in a communication counterpart device which is the one of the plurality of wireless devices, and (iii) comparison between
- an estimated first amount of time that is calculated to be taken, to complete communicating a remaining amount of the wireless communication and complete communicating a target amount of the wireless communication, using a first pair of a transmission method and a channel, and
- an estimated second amount of time that is calculated to be taken to complete communicating the target amount of the wireless communication using a second pair, different than the first pair, of a transmission method and a channel, wherein the first pair is switched to the second pair to be used by the computer in response to the first amount of time being larger than the second amount of time.

6. An information processing apparatus comprising:
communication means for conducting a wireless communication with one of a plurality of wireless devices using a plurality of transmission methods, at least one of which has a plurality of channels; and
changing means for changing a currently established wireless communication with the one of the plurality of wireless devices with respect to at least one of a plurality of pairs of a transmission method and a channel according to:
  (i) a predetermined selection order of the transmission methods and the channels,
  (ii) a transmission method or a channel provided in a communication counterpart device which is the one of the plurality of wireless devices, and
  (iii) comparison between
    - an estimated first amount of time that is calculated to be taken, to complete communicating a remaining amount of the wireless communication and complete communicating a target amount of the wireless communication, using a first pair of a transmission method and a channel, and
    - an estimated second amount of time that is calculated to be taken to complete communicating the target amount of the wireless communication using a second pair, different than the first pair, of a transmission method and a channel,
  wherein the first pair is switched to the second pair to be used by the information processing apparatus in response to the first amount of time being larger than the second amount of time.

7. The information processing apparatus according to claim 1, wherein:
the estimated first amount of time is a sum of a standby time and a communication time required to complete communicating the remaining amount of the wireless communication and complete communicating the target amount of the wireless communication, using the first pair of the transmission method and the channel, and
the estimated second amount of time is a sum of a standby time and a communication time required to complete communicating the target amount of the wireless communication using the second pair of the transmission method and the channel.

* * * * *